US009640099B2

(12) United States Patent
Mu

(10) Patent No.: US 9,640,099 B2
(45) Date of Patent: May 2, 2017

(54) DISPLAY CONTROL CIRCUIT, DISPLAY CONTROL METHOD AND DISPLAY APPARATUS

(71) Applicant: BOE TECHNOLOGY GROUP CO., LTD., Beijing (CN)

(72) Inventor: Xinxin Mu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 334 days.

(21) Appl. No.: 14/367,364

(22) PCT Filed: Jun. 27, 2013

(86) PCT No.: PCT/CN2013/078216
§ 371 (c)(1),
(2) Date: Jun. 20, 2014

(87) PCT Pub. No.: WO2014/173003
PCT Pub. Date: Oct. 30, 2014

(65) Prior Publication Data
US 2016/0163245 A1 Jun. 9, 2016

(30) Foreign Application Priority Data
Apr. 27, 2013 (CN) .......................... 2013 1 0153084

(51) Int. Cl.
*G06F 3/038* (2013.01)
*G09G 3/20* (2006.01)

(52) U.S. Cl.
CPC ....... *G09G 3/20* (2013.01); *G09G 2300/0426* (2013.01); *G09G 2300/0842* (2013.01);
(Continued)

(58) Field of Classification Search
CPC ................ G09G 3/20; G09G 2310/08; G09G 2300/0426; G09G 2300/0842;
(Continued)

(56) References Cited

U.S. PATENT DOCUMENTS 7,893,933 B2 * 2/2011 Yi ........................ G09G 3/3611 345/204
2006/0244707 A1 * 11/2006 Furihata ............... G09G 3/2048 345/98

(Continued)

FOREIGN PATENT DOCUMENTS

CN 101071543 A 11/2007
CN 101901126 A 12/2010

(Continued)

OTHER PUBLICATIONS

English translation of International Preliminary Report on Patentability and Written Opinion of the International Searching Authority of PCT/CN2013/078216, issued Oct. 27, 2015.

(Continued)

*Primary Examiner* — Rodney Amadiz
(74) *Attorney, Agent, or Firm* — Collard & Roe, P.C.

(57) ABSTRACT

The present disclosure relates to the field of display technique. Disclosed are a display control circuit, a display control method and a display apparatus. The circuit comprises: a signal supplying unit for outputting an image data signal; a timing control unit for processing the image data signal into an signal recognizable for a driving circuit unit; a storage unit for storing and transmitting the signal recognizable to the driving circuit unit; a sample storing unit connected with the signal supplying unit, for acquiring and storing the image data signal; and a sample comparing unit for comparing a current frame signal outputted from the signal supplying unit with a previous frame signal stored in the sample storing unit and controlling the timing control
(Continued)

unit to be turned on or off and controlling whether the signal stored in the storage unit needs to be updated according to a comparison result. In the embodiments of the present disclosure, part of modules in the timing control unit are turned off and the image data signal to be displayed is provided to the driving circuit unit by the storage unit when the signal outputted from the signal supplying unit is unchanged, so that intermittent operations of part of the modules are realized to reduce the power consumption in the circuit.

2 Claims, 1 Drawing Sheet

(52) U.S. Cl.
CPC ... *G09G 2310/08* (2013.01); *G09G 2320/103* (2013.01); *G09G 2330/021* (2013.01); *G09G 2330/022* (2013.01)

(58) Field of Classification Search
CPC ....... G09G 2330/021; G09G 2330/022; G09G 2320/103
See application file for complete search history.

(56) References Cited

U.S. PATENT DOCUMENTS

2009/0322969 A1 12/2009 Unger
2010/0277463 A1* 11/2010 Yen .......................... G09G 3/20 345/213
2012/0038618 A1* 2/2012 Koyama .............. G09G 3/3688 345/212
2012/0146968 A1* 6/2012 Glen ...................... G09G 5/003 345/204
2013/0057520 A1* 3/2013 Hsiao ....................... G09G 3/20 345/204
2013/0278614 A1* 10/2013 Sultenfuss ........... G09G 3/3406 345/520
2014/0160184 A1 6/2014 Wang
2014/0204068 A1* 7/2014 Chen ........................ G09G 5/18 345/211

FOREIGN PATENT DOCUMENTS

CN 103000119 A 3/2013
WO 2011/081041 A1 7/2011

OTHER PUBLICATIONS

Chinese Office Action of Chinese Application No. 201310153084.8, mailed Apr. 3, 2015 with English translation.

English Translation of the International Search Report of PCT/CN2013/078216 published in English on Oct. 30, 2014.

International Search Report, International Preliminary Report on Patentability and Written Opinion of the International Searching Authority of PCT/2013/078216 in Chinese, mailed Jan. 30, 2014.

* cited by examiner

DISPLAY CONTROL CIRCUIT, DISPLAY CONTROL METHOD AND DISPLAY APPARATUS

CROSS REFERENCE TO RELATED APPLICATIONS

This application is the National Stage of PCT/CN2013/078216 filed on Jun. 27, 2013, which claims priority under 35 U.S.C. §119 of Chinese Application No. 201310153084.8 filed on Apr. 27, 2013, the disclosure of which is incorporated by reference.

TECHNICAL FIELD

The present disclosure relates to the field of display technique, and particularly, to a display control circuit, a display control method and a display apparatus.

BACKGROUND

A traditional display control circuit, of which a structure principle diagram is as shown in FIG. 1, comprises: a signal supplying unit for outputting an image data signal required to be displayed by a display screen; a timing control unit connected with the signal supplying unit, for receiving the image data signal outputted from the signal supplying unit, processing and converting the signal into a signal recognizable for a driving circuit unit, in order that the driving circuit unit in turn outputs the signal to the display screen to display an image. No matter whether the image displayed by the display screen finally changes, the display control circuit should update regularly to reflect the image data signal outputted from the signal supplying unit on the display screen.

However, a picture is not needed to be updated regularly in some applications such as a billboard and the like, and mostly is a still image, but the display control unit still updates the picture regularly at a circuit frequency, such that a power consumption of an entire display apparatus increases.

SUMMARY

One technical problem to be solved by the present disclosure is to provide a display control circuit in order to reduce power consumption when a display apparatus displays an image.

In order to settle the above technical problem, the present disclosure provides a display control circuit comprising:

a signal supplying unit configured to output an image data signal to be displayed;

a timing control unit connected with the signal supplying unit, configured to process the image data signal and convert the same into an signal recognizable for a driving circuit unit;

a storage unit connected with the timing control unit and the driving circuit unit, and configured to store the signal recognizable for the driving circuit unit and transmit the signal recognizable for the driving circuit unit to the driving circuit unit to drive a display screen to display an image;

a sample storing unit connected with the signal supplying unit, and configured to acquire and store the image data signal outputted from the signal supplying unit;

a sample comparing unit connected with the sample storing unit, the signal supplying unit, the timing control unit and the storage unit respectively, and configured to compare a current frame signal outputted from the signal supplying unit with a previous frame signal stored in the sample storing unit and transmit a comparison result to the timing control unit and the storage unit so as to control the timing control unit to turned on or off and control whether the signal stored in the storage unit needs to be updated.

Further, the timing control unit comprises an updating module and a signal conversion module connected thereto, the updating module is connected with the signal supplying unit, the signal conversion module is connected with the storage unit, the updating module is configured to acquire the image data signal inputted from the signal supplying unit in real-time, and the signal conversion module is configured to convert the image data signal into the signal recognizable for the driving circuit unit.

Further, the timing control unit further comprises a control module connected with the updating module, the control module is connected with the sample comparing unit and controls the updating module to be turned on or off according to the comparison result of the sample comparing unit.

Further, the storage unit comprises a control module and a storage module connected thereto, the control module is connected with the sample comparing unit, the storage module is connected with the timing control unit and a driving display unit respectively, and the control module controls whether the signal stored in the storage module needs to be updated according to the comparison result of the sample comparing unit.

The present disclosure further provides a display control method comprises steps of:

outputting, by a signal supplying unit, an image data signal to be displayed; acquiring and processing, by a timing control unit, the image data signal; transferring the processed signal to a storage unit for storing, and transferring, by the storage unit, the same to a driving circuit unit; and driving, by the driving circuit unit, a display screen to display an image;

wherein a sample storing unit is configured to acquire and store the image data signal, a sample comparing unit is configured to compare a current frame image data signal outputted from the signal supplying unit with a previous frame image data signal stored in the sample storing unit and transmitting a comparison result to the timing control unit and the storage unit, in order to control the timing control unit to be turned on or off and control whether the signal stored in the storage unit needs to be updated.

Further, a case where the timing control unit and the storage unit are controlled according to the comparison result of the sample comparing unit is as follows:

when the current frame image data signal provided by the signal supplying unit is the same as the previous frame image data signal, the sample comparing unit acquires a result that the signal remains unchanged, and at this time the timing control unit is controlled to be turned off and the storage unit is controlled to remain the signal stored therein and the signal transmitted to the driving circuit unit unchanged; and when the current frame image data signal provided by the signal supplying unit is different from the previous frame image data signal, the sample comparing unit acquires a result that the signal is changed, and at this time the timing control unit is controlled to be turned on and the storage unit is controlled to update the signal stored inside it and the signal transmitted to the driving circuit unit.

The present disclosure further provides a display apparatus comprising a display screen, a driving circuit unit and any one of the display control circuits described above, the storage unit in the display control circuit is connected with the driving circuit unit which is in turn connected with the display screen, the image data signal to be displayed is transferred to the driving circuit unit by the display control circuit, and the display screen is driven to display the image by the driving circuit unit according to the image data signal to be displayed.

In the display control circuit, the display control method and the display apparatus provided in the above solutions, by disposing the storage unit between the timing control unit and the driving circuit unit, connecting the sample storing unit to the signal supplying unit and arranging the sample comparing unit to be connected with the sample storing unit, the signal supplying unit, the timing control unit and the storage unit, the display control circuit realizes the operations of turning off respective unrelated function modules in the timing control unit and providing the image data signal to be displayed to the driving circuit unit by the storage unit, when the signal outputted from the signal supplying unit is unchanged, so that intermittent operations of part of the modules are realized to reduce the power consumption in the circuit.

DETAILED DESCRIPTION

Detailed implementations of the present disclosure will be described in details thereafter in connection with drawings and embodiments. Following embodiments are only used to illustrate the present disclosure, instead of limiting a scope of the present disclosure.

Figure 1:
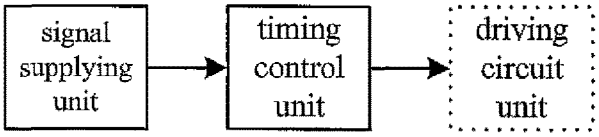
FIG. 1 is a principle diagram of a structure of a display control circuit as known in the art.
Figure 2:
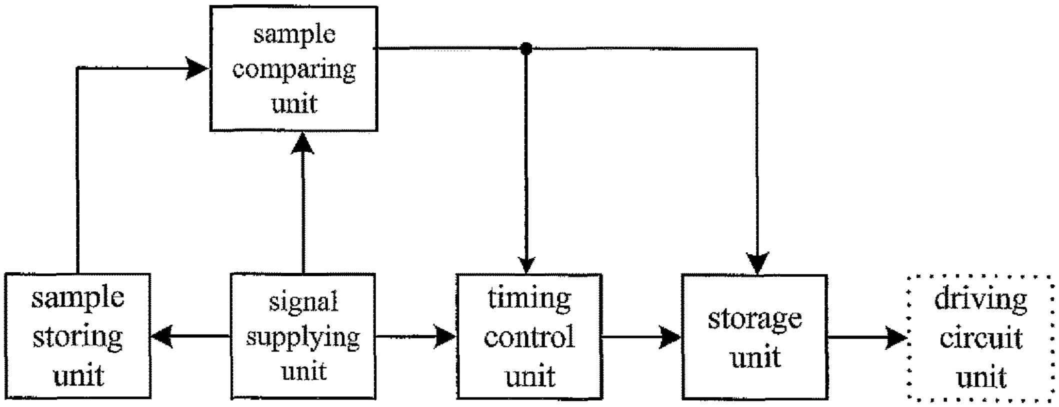
FIG. 2 is a principle diagram of a structure of a display control circuit according to embodiments of the present disclosure.

FIG. 2 illustrates a principle diagram of a structure of a display control circuit according to embodiments of the present disclosure. As illustrated in FIG. 2, the display control circuit comprises:

a signal supplying unit for outputting an image data signal to be displayed;

a timing control unit connected with the signal supplying unit, for processing and converting the image data signal into an signal recognizable for a driving circuit unit to be transmitted to the driving circuit unit which drives a display screen to display an image;

a storage unit connected with the timing control unit and the driving circuit unit, for storing the signal recognizable for the driving circuit unit and transmitting the signal recognizable for the driving circuit unit to the driving circuit unit to drive the display screen to display the image; the storage unit only stores the signal recognizable for the driving circuit unit temporarily a sample storing unit connected with the signal supplying unit, for acquiring and storing the image data signal outputted from the signal supplying unit;

a sample comparing unit connected with the sample storing unit, the signal supplying unit, the timing control unit and the storage unit respectively, for comparing a current frame of signal outputted from the signal supplying unit with a previous frame of signal stored in the sample storing unit and transmitting a comparison result to the timing control unit and the storage unit so as to control the timing control unit to turn on or off and control whether the signal stored in the storage unit needs to be updated.

When the current frame of signal outputted from the signal supplying unit is same as the previous frame of signal stored in the sample storing unit, the sample comparing unit transmits a result indicating that the signals are same to the timing control unit and the storage unit so as to control the timing control unit to be OFF and control the signal stored in the storage unit to keep unchanged, and at this time, part of function modules in the timing control unit do not operate such that the power consumption is decreased markedly; when the current frame signal outputted from the signal supplying unit is different from the previous frame signal stored in the sample storing unit, the sample comparing unit outputs a result indicating that the signals are different to the timing control unit and the storage unit so as to control the timing control unit to be turned on and control the signal stored in the storage unit to be updated, thereby the original signal is replaced by a new signal. Thus, intermittent operations of part of modules in the timing control unit are realized.

Specifically, the timing control unit comprises an updating module and a signal conversion module connected thereto, the updating module is connected with the signal supplying unit, the signal conversion module is connected with the storage unit, the updating module is configured to acquire the image data signal inputted from the signal supplying unit in real time, and the signal conversion module is configured to convert the image data signal into the signal recognizable for the driving circuit unit. The timing control unit further comprises a control module connected with the updating module, the control module is connected with the sample comparing unit and controls the updating module to be turned on or off according to the comparison result of the sample comparing unit. When the current frame signal outputted from the signal supplying unit is the same as the previous frame signal stored in the sample storing unit, the modules which may be turned off in the timing control unit can be the updating module and the signal conversion module, and the turning off of these two modules can reduce the power consumption in the timing control unit markedly.

In the embodiment, the storage unit comprises a control module and a storage module connected thereto, the control module is connected with the sample comparing unit, the storage module is connected with the timing control unit and a driving display unit respectively, and only used to store signals, and the control module controls whether the signal stored in the storage module needs to be updated according to the comparison result of the sample comparing unit. When the sample comparing unit transmits the result of the comparison indicating that the signals are same to the control module, the control module controls the signal transmitted to the driving circuit unit by the storage unit to keep unchanged; and when the sample comparing unit transmits the result of the comparison indicating that the signals are different to the control module, the control module controls the signal stored in the storage module to be updated and transmits the updated signal to the driving circuit unit.

The display control circuit according to the embodiments of the present disclosure can turn off part of modules in the display control circuit according to whether the image data signal outputted from the signal supplying unit changes by configuring the storage unit, the sample storing unit and the sample comparing unit, so that the power consumption in the display control circuit is reduced without affecting an image display on the display screen.

Further, the present disclosure also provides a display control method which may be described based on the above display control circuit, comprises operation steps of:

outputting, by the signal supplying unit, the image data signal to be displayed; acquiring and processing, by the timing control unit, the image data signal; transmitting the processed signal to the storage unit for storing, and transmitting, by the storage unit, the same to the driving circuit unit; and driving, by the driving circuit unit, the display screen to display the image;

meanwhile a sample storing unit acquires and stores the image data signal, a sample comparing unit compares the current frame of image data signal outputted from the signal supplying unit with the previous frame of image data signal stored in the sample storing unit and transmits the comparison result to the timing control unit and the storage unit, in order to control the timing control unit to be ON or OFF and control whether the signal stored in the storage unit needs to be updated.

Specifically, a case where the timing control unit and the storage unit are controlled according to the comparison result of the sample comparing unit is as follows:

when the current frame image data signal provided by the signal supplying unit is the same as the previous frame image data signal, the sample comparing unit obtains a result that the signal remains unchanged, and at this time the timing control unit is controlled to be turned off and the storage unit is controlled to remain the signal stored therein and the signal transmitted to the driving circuit unit unchanged; wherein the modules turned off in the timing control unit is the updating module and signal conversion module; and when the current frame image data signal provided by the signal supplying unit is different from the previous frame image data signal, the sample comparing unit obtains a result that the signal is changed, and at this time the timing control unit is controlled to be turned on and the storage unit is controlled to update the signal stored inside it and the signal transmitted to the driving circuit unit.

Further, the present disclosure also provides a display apparatus comprising the display screen, the driving circuit unit and any one of the display control circuits described above, the storage unit in the display control circuit is connected with the driving circuit unit which is in turn connected with the display screen, the image data signal to be displayed is transmitted to the driving circuit unit by the display control circuit, and the display screen is driven to display the image by the driving circuit unit according to the image data signal to be displayed.

The display apparatus in the present embodiment may be any products or components having a display function such as a liquid crystal TV, a notebook computer, a tablet computer, a mobile phone, a digital photo frame, a piece of electric paper and the like.

It can be seen from the above embodiment, by disposing the storage unit between the timing control unit and the driving circuit unit, connecting the sample storing unit to the signal supplying unit and configuring the sample comparing unit to be connected with the sample storing unit, the signal supplying unit, the timing control unit and the storage unit, the display control circuit according to the embodiments of the present disclosure can realize turning off respective unrelated function modules in the timing control unit and providing the image data signal to be displayed to the driving circuit unit by the storage unit when the signal outputted from the signal supplying unit is unchanged, so that intermittent operations of part of the modules are realized to reduce the power consumption in the circuit.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. A display control method comprises steps of:

outputting an image data signal to be displayed by a signal supplying unit;

acquiring the image data signal and processing the same by a timing control unit;

transmitting the processed signal to a storage unit for storing, and transmitting the same to a driving circuit unit by the storage unit; and driving a display screen to display an image by the driving circuit unit;

wherein a sample storing unit is configured to acquire and store the image data signal, a sample comparing unit is configured to compare a current frame image data signal outputted from the signal supplying unit with a previous frame image data signal stored in the sample storing unit and transmit a comparison result to the timing control unit and the storage unit to control the timing control unit to be turned on or off and control whether the signal stored in the storage unit needs to be updated.

2. The display control method of claim 1, wherein:

when the current frame image data signal provided by the signal supplying unit is the same as the previous frame image data signal, the sample comparing unit acquires a result that the signal remains unchanged, and at this time the timing control unit is controlled to be turned off and the storage unit is controlled to remain the signal stored therein and the signal transmitted to the driving circuit unit unchanged; and when the current frame image data signal provided by the signal supplying unit is different from the previous frame image data signal, the sample comparing unit acquires a result that the signal is changed, and at this time the timing control unit is controlled to be turned on and the storage unit is controlled to update the signal stored therein and the signal transmitted to the driving circuit unit.

* * * * *